United States Patent [19]

Weddleton

[11] 3,853,817

[45] Dec. 10, 1974

[54] TIN CONTAINING ESTERIMIDE POLYMER RESINS AND METHOD OF FORMING

[75] Inventor: Richard Francis Weddleton, Schenectady, N.Y.

[73] Assignee: General Electric Company, Schenectady, N.Y.

[22] Filed: June 8, 1973

[21] Appl. No.: 368,178

Related U.S. Application Data

[63] Continuation-in-part of Ser. No. 154,184, June 17, 1971, abandoned.

[52] U.S. Cl............. 260/75 N, 117/75, 117/93.4 R, 117/128.4, 117/132 B, 117/230, 117/232, 260/30.2
[51] Int. Cl....................... C08g 20/32, C08g 17/04
[58] Field of Search................................... 260/75 N

[56] References Cited
UNITED STATES PATENTS

| | | | |
|---|---|---|---|
| 3,382,203 | 5/1968 | Rating et al. | 260/33.4 |
| 3,426,098 | 2/1969 | Meyer et al. | 260/841 |

FOREIGN PATENTS OR APPLICATIONS

| | | |
|---|---|---|
| 1,055,287 | 1/1967 | Great Britain |
| 1,520,061 | 7/1969 | Germany |

Primary Examiner—Melvin Goldstein
Attorney, Agent, or Firm—Vale P. Myles

[57] ABSTRACT

A thermosetting esterimide resin suitable for powder deposition atop an electrical conductor is formed by reacting a polyfunctional organotin compound with at least one polyhydric alcohol and a polycarboxylic acid or acid derivative in the presence of a catalyst to produce a polyester having tin atoms in the polymer backbone. A carboxy functional polyimide intermediate then is formed in conventional fashion, i.e., as the reaction product of a diamine and an aromatic carboxylic anhydride having at least one additional carboxylic acid group in the molecule, whereafter the tin containing polyester and the carboxy functional polyimide intermediate are slowly mixed at a maximum pot temperature of approximately 200°C to obtain a branched thermosetting esterimide resin containing tin atoms in the polymer backbone. When ground to a powder, e.g., 200–325 mesh, the esterimide polymer resin is suitable for electrostatic spray deposition atop an electrical conductor to form an electrically insulating coating thereon, with excellent corner coverage on rectangular wire, flexibility, thermal stability and varnish compatibility.

11 Claims, No Drawings

TIN CONTAINING ESTERIMIDE POLYMER RESINS AND METHOD OF FORMING

This is a continuation-in-part application of application Ser. No. 154,184, filed June 17, 1971, now abandoned.

This invention relates to tin containing esterimide resins suitable for insulating wire by powder deposition techniques and to a method of forming such resins. In particular, the invention relates to esterimide resins formed by reacting a carboxy functional polyimide containing intermediate with a polyester intermediate containing tin atoms in its backbone to obtain an esterimide resin having flow and adhesion characteristics suitable for powder application to wire, to give coatings with excellent uniformity in coating thickness, flexibility, thermal stability and varnish compatibility.

Esterimide resin based wire enamels have been utilized for many years in liquid form to dip coat wire conductors utilizing conventional die application procedures. When rectangular wire is dip coated, however, the high mobility of the liquid resin allows the resin to pull away from the corners of the wire during cure. Thus, to obtain any significant build of insulation at the corners, multiple dipping and curing of the wire generally has been required. The multidipped rectangular wire, however, characteristically has a much thicker coating on the flat surfaces of the wire than is required to electrically insulate these surfaces in order to obtain adequate corner coverage. While direct application of the resin to the wire by powder techniques, such as fluid bed, electrostatic spray or electrostatic fluid bed coating procedure, enhance corner coverage because no solvent is present, esterimide resins applied by powder techniques heretofore have not been characterized by adequate flow characteristics during curing, nor by sufficient adhesion, to effectively insulate the wire.

The esterimide resins used in these wire enamel formulations do not thermally cure to give flexible coatings, but require additional cross-linking agents such as a blocked polyisocyanate, e.g., Mordur SH (available from Mobay Chemical Co. of Pittsburgh, Pa.), and resin modifiers such as a phenol-formaldehyde resin. The presence of a blocked isocyanate additive leads to linkages in the cured coating, which limit its thermal stability and varnish compatibility.

It is therefore an object of this invention to provide a thermosetting esterimide resin exhibiting optimum flow characteristics upon powder spray deposition and thermal curing to produce uniform coatings on round and rectangular conductors, with improved dielectric strength, flexibility, thermal stability and chemical resistance required for use in Class F (155°C) motor coils.

It is also an object of this invention to provide a novel technique for forming esterimide resins especially suited for application by electrostatic spray coating techniques.

These and other objects of this invention generally are achieved by a branched thermosetting esterimide resin containing between 0.4 and 2% by weight tin atoms in the backbone of the polymer. Such polymer structures are obtained by preparing the polyester portion of the resin separately in the presence of the polyfunctional organotin compound to form a branched hydroxy functional polyester resin containing tin atoms in the polyester backbone whereupon the tin containing polyester is reacted with a conventional carboxy functional polyimide intermediate (i.e., a polyimide formed as a reaction product of an aromatic carboxylic anhydride having at least one additional carboxylic acid group in the molecule and a polyamine) to produce the thermosetting esterimide resins of the invention.

Because of the presence of a relatively high level of tin atoms in the polymer backbone, the resin can be cured to give flexible coatings without adding additional cross-linking agents or catalysts. In this way, powdered resins are obtained having excellent melt flow characteristics during curing to produce smooth, flexible coatings of uniform thickness around the entire periphery of rectangular or round magnet wire.

Although the invention is disclosed with particularity in the appended claims, a more complete understanding of the invention may be obtained from the following detailed disclosure of the preparation of various esterimide polymers in accordance with this invention.

To form the branched esterimide resin of this invention, the polyester component of the esterimide resin is formed separately in the presence of a polyfunctional organotin compound, to place tin atoms within the backbone of the polyester. The polyester otherwise is formed in conventional fashion, i.e., as a mixture of one or more polyhydric alcohols and one or more polycarboxylic acids or their derivatives, with the ratio of the number of equivalents of alcohol to the number of equivalents of acid being such that the number of hydroxyl groups is preferably between 1.5 and 2.5 times the number of carboxylic groups on the acid components. The organotin component is added to the mixture in quantities sufficient to produce a metal content between 0.4 and 2% by weight of the resultant esterimide polymer and the reaction is conducted at a temperature of approximately 175°C.

Among the alcohols suitable for forming the ester polymer include ethylene glycol, tris(2-hydroxyethyl)isocyanurate, glycerine, propylene glycol and mixtures of the foregoing alcohols. Other polyhydric alcohols, however, such as 1,4-cyclohexane dimethanol; pentaerythritol; sorbitol; dipentaerythritol; 1,1,1-trimethylolethane; mannitol; 1,1,1-trimethylolpropane; trimethylene glycol; propylene glycol; hydroquinone; dibeta-hydroxethyl ether; pentanediol-1,5; and neopentylene glycol also could be substituted for some or all of the foregoing alcohols. Preferably, the polyhydric alcohols employed to form the polyester contain a mixture of the foregoing alcohols, e.g., at least 50–90% by weight tris(2-hydroxyethyl)isocyanurate and 50–10% by weight of at least one other alcohol such as ethylene glycol.

Polycarboxylic acids suitable for forming the branched polyester include isophthalic acid, terephthalic acid, benzophenone dicarboxylic acid, and mixtures of the foregoing acids with up to 50% by weight of an acid selected from the group consisting of succinic acid, trimesic acid, hemimellitic acid, trimellitic acid, orthophthalic anhydride, tetrachlorophthalic acid, sebacic acid and hexachloroendomethylene tetrahydrophthalic acid. Although the free acids can be reacted to form the polyester, the acids typically are utilized in the form of their lower dialkyl esters, i.e., as dimethyl, diethyl or dibutyl esters.

The materials suitable for incorporating tin atoms into the polyester backbone are well-known in the art and would include materials such as the di-alkyltin oxides (e.g., di-n-butyltin oxide, diethyltin oxide, dimethyltin oxide, diphenyltin oxide); dialkyltin diesters of short chain distillable carboxylic acids such as acetic acid, or propionic acid (e.g., di-n-butyltin diacetate); di-n-butyltin disebacate; di-alkyltin dialkyloxides (e.g., dibutyltin dibutoxide, dibutyltin dimethoxide, dibutyltin diethoxide).

In general, the catalyst can be any tin compound which is capable of partially dissolving in the polyester ingredients and reacting with them to form a branched polyester having tin atoms in the backbone of the recurrent ester groups. These tin compounds must be multifunctional in order to enter the polyester backbone rather than being attached to the end of the polyester chain, as would occur if monofunctional tin compounds were used. Because the higher multifunctional tin esterification catalysts form cross-links reducing the mobility of the tin catalyst site, divalent compounds are preferred for utilization in this invention. The tin compounds suitable for forming the branched polyester therefore include esters and alkoxides of all short chain distillable acids and alcohols wherein the acid or alcohol can be distilled off during the reaction of the tin with the other polyester ingredients.

To form the polyester portion of the esterimide, the chosen alcohols, acids and esterification catalyst, e.g., 113 grams dimethyl terephthalate, 60 grams tris(2-hydroxyethyl)isocyanurate, 40 grams ethylene glycol, 0.008 grams litharge and 5.8 grams di-n-butyltin oxide, are heated to a temperature between approximately 160°C and 200°C with a nitrogen bleed passing through the otherwise closed reaction chamber to remove the water and methanol evolved during formation of the polyester. Removal of ethylene glycol from the reaction chamber during heating is prevented by a steam condenser at the exhaust orifice which passes water and methanol from the reaction chamber as vapors while condensing the ethylene glycol for a gravity return to the reaction chamber. With a catalyst, such as the litharge, present in the mixture in small quantities, the branched polyester customarily is formed within approximately six hours.

The polyimide portion of the resin is compounded separately from the polyester portion and can be produced by any known technique for forming polyimides, e.g., reacting an anhydride with a diamine in an approximately 2:1 weight ratio. Among the anhydrides known to be suitable for forming the polyimide are trimellitic anhydride; benzophenone-2,2',3,3'-tetracarboxylic dianhydride, pyromellitic dianhydride; 3,3',4,4'-diphenyl tetracarboxylic dianhydride and 2,3,6,7-naphthalene dianhydride, while diamines suitable for forming the polyimide would include methylene dianiline; benzidine; 1,4-diaminonaphthalene; $\alpha,\omega$-nonamethylene diamine; xylene diamine; ethylene diamine; m-phenylene diamine; 3,3'-diaminodiphenyl; p-phenylene diamine; 4,4'-diaminodiphenyl ether; diaminodiphenyl ketone; hexamethylene diamine; 4,4'-dicyclohexylmethane diamine; diamonidiphenyl sulfone and bis-(4-aminophenyl)- $\alpha,\alpha'$-p-xylene.

In general, trimellitic anhydride is preferred as the anhydride because of the reduced cost of the material while methylene dianiline or hexamethylene diamine are preferred as the diamine. Approximately 2 moles of the chosen anhydride is employed for each mole of the diamine.

The polyimide reaction normally is carried out in the presence of a known solvent such as dimethylacetamide, dimethyl sulfoxide, dimethylformamide, N-methylpyrrolidone, N-methylcaprolactam, xylene, p-cresol, cresylic acid, m-p-cresol mixture, dimethyl sulfone, et cetera. Mixtures of the foregoing solvents can be used if desired, e.g., blends of N-methylpyrrolidone and xylene in equal weight ratios. Solvents remaining after the formation of the polyimide, however, should be washed from the polyimide (as will be more fully explained hereafter) before reacting it with the polyester in order to prepare a truly 100% solids esterimide resin.

To form the polyimide portion of the resin, a mixture of the chosen anhydride and solvent, e.g., 1229 grams trimellitic anhydride and 1280 grams N-methylpyrrolidone, are added to a 5 liter flask immersed in an oil bath and heated to an oil bath temperature of approximately 140°C. A solution of diamine, e.g., 634 grams methylene dianiline in 640 grams of N-methylpyrrolidone, then is added slowly, i.e., over one hour, with stirring under a slow stream of nitrogen and continued heating to approximately 165°C. Heating is continued to an oil temperature of approximately 190°C to remove water given off in the reaction and convert the ingredients to a diacid diimide. Typically, the reaction takes about 5 to 10 hours at the foregoing temperatures. As is customery with most chemical reactions, the reaction time can be altered by varying the temperatures utilized to form the diacid diimide. The diacid diimide solution, while still hot, then is poured slowly into a bath of distilled water with high shear stirring (e.g., utilizing a Cowles Dissolver Model IVG) to remove solvent from the diacid diimide. After the diacid diimide is filtered from the water, the filter cake is washed with weak acid, e.g., 1%, hydrochloric acid solution, to remove any remaining diamine, washed again with distilled water, and vacuum dried to a final temperature of approximately 180°C at a pressure of 1 Torr.

The polyester containing the metal atoms in its backbone and the polyimide can be reacted directly to form the branched esterimide polymer resin by heating the polyester under nitrogen to about 190°C and adding the polyimide in small portions under constant agitation to assure dissolution and reaction of the polyimide with the polyester. Typically, the polyimide comprises approximately 30–40% by weight of the resultant esterimide polymer resin and the polyimide is added in several equal portions over a period of approximately four hours to prevent solidification of the reaction mixture.

Although the branched polyester and polyimide can be reacted directly as heretofore explained, a more homogeneous mixture is obtained in accordance with this invention when a diester of the polyimide is formed prior to mixing the polyimide with the branched polyester. To form the diester of the polyimide, the polyimide is mixed with a polyhydric alcohol, e.g., ethylene glycol, in approximately a two-thirds weight ratio in the presence of a small quantity of catalyst, e.g., litharge, and the mixture is heated to a maximum pot temperature of 180°–200°C under a nitrogen bleed until the expected amount of water is collected and a clear solution is obtained. The reaction product while still hot is poured into distilled water, filtered, washed again with water and vacuum dried to provide the polyhydric alcohol diester of the diacid diimide. The polyhydric alcohol diester of the polyimide then is slowly added to the polyester containing metal in the polymer backbone at an elevated temperature, e.g., between 180°-220°C, to form the branched esterimide polymer containing tin atoms in the polymer backbone. Desirably, the polyester forms approximately 60–70% by weight of the resultant esterimide polymer.

To obtain an esterimide resin capable of giving a flexible coating using powder coating techniques, the esterimide resin (after formation by either of the two foregoing techniques) is reacted further in a rapidly flowing nitrogen stream with vacuum applied at the exit port to remove reaction volatiles, such as ethylene glycol, to increase the softening point of the resin to between 80° and 150°C. Heating of the polymer is terminated when periodically removed samples of the esterimide polymer indicate a polymer softening point within the desired range. The product is a branched, i.e., nonlinear but not cross-linked, esterimide polymer containing 0.4% to 2% by weight tin atoms in the polymer backbone. The polymer is thermosetting when heated above approximately 250°C and is characterized by an inherent viscosity (0.5% in N-methylpyrrolidone) above 0.05 and a softening point above 80°C.

In order to apply the esterimide polymer to wire, the polymer is ground to a fine powder, i.e., typically finer than 200 mesh, and electrostatic spray techniques are employed to deposit the powder on the wire. In conventional fashion, the wire is at ground potential during spraying and an electrostatic charge is placed on the esterimide polymer powder utilizing a conventional electrostatic spray hand gun. The wire then is passed through the charged powder cloud at a rate of approximately 10 ft./min. to deposit an approximately 0.5–3 mil thick polymer coating thereon. After the polymer coating is cured, e.g., by passing the wire at 10 ft./min. through an 18 ft. long vertical oven set at 220°C at the bottom and 440°C at the top, the insulated wire is suitable for winding motor field poles. For applications requiring a higher and more uniform dielectric strength in the insulation, e.g., for winding motor field coils, the spray coated wire preferably is overcoated with a polyimide, such as Pyre-ML wire enamel, an amide-imide or an esterimide wire enamel utilizing conventional dip coating techniques. Because of the thick coatings and excellent corner coverage obtained in one coat by electrostatic spray deposition of the esterimide polymer resin in the wire, the number of required dips, even when an overcoat is required, is significantly reduced.

The basic principles of this invention are illustrated by the following specific examples:

EXAMPLE 1

A tin containing polyester is prepared by mixing 1350 grams tris(2-hydroxyethyl)isocyanurate, 876 grams dimethyl terephthalate, 420 grams ethylene glycol, 1.2 grams litharge and 81 grams di-n-butyltin oxide. The mixture then is heated under a slow stream of nitrogen for approximately 6 hours to a maximum pot temperature of 175°C, with mechanical stirring being used as soon as the mixture becomes sufficiently fluid. A steam condenser at the exit port from the reaction chamber functions to return any ethylene glycol within the flowing atmosphere into the reaction chamber while passing the water and methanol to a Dean and Stark trap topped with a water cooled condenser. A total of approximately 210 g. of distillate is collected during the reaction.

The polyimide portion of the esterimide polymer then is prepared in a separate reaction chamber by dissolving 1229 g. of trimellitic anhydride in 1280 g. of N-methylpyrrolidone at about 140°C. To this solution is added a solution of 637 g. of methylene dianiline in 640 g. N-methylpyrrolidone over a period of 1 hour with continued heating to about 160°C. The clear solution is heated for an additional 5 hours to a maximum pot temperature of approximately 170°C to distill off the water and convert the mixture to a diacid diimide having a melting point of approximately 350°C. The resulting solution, while still hot, is poured into 3 gallons of distilled water and mixed with a high speed mixer to segregate the N-methylpyrrolidone from the diacid diimide. The diacid diimide next is filtered, and successively washed in a 1% hydrochloric acid solution and distilled water before being vacuum dried over a period of 18 hours to a final temperature of 180°C at a pressure of 1 Torr.

After drying of the diacid diimide, an ethylene glycol diester of the diacid diimide is prepared by mixing 1000 grams of the diacid diimide with 1500 grams ethylene glycol and 0.8 grams litharge and cooking the mixture for 22 hours to a maximum pot temperature of 190°C. A slowly flowing nitrogen bleed is passed through the reaction chamber during the conversion and the water evolved (54 g.) is collected in a Dean and Stark trap. Cooking is terminated when a clear solution is obtained and no additional water is collected over a 30 minute period, whereupon the reaction product, while still hot, is poured into 3 gallons of distilled water with high shear mixing. The reaction product then is filtered, washed again with water, filtered and dried to a final temperature of 72°C at a pressure of 1 Torr over an 18 hour period.

Three hundred grams of the ethylene glycol diester of the diacid diimide then is added in approximately 20 equal portions to 600 grams of the tin containing polyester to form the tin containing esterimide polymer. The polyester is heated in a two liter resin flask immersed in an oil bath at about 190°C during mixing and the diester is added to the molten polyester over a period of approximately 3 hours in the presence of a nitrogen bleed. After the addition is complete, the temperature of the oil bath is raised to 240°C over a period of 15 hours under a fast stream of nitrogen with vacuum being applied at the exit port. While only a slight vacuum can be applied at first because low pressure tends to cause the reaction mixture to foam, more vacuum can be applied as the reaction proceeds until a pressure of about 3 Torr can be used. During the reaction, ethylene glycol is given off and the reaction product increases in viscosity. Samples are continuously removed during the reaction and heating is terminated when the softening point of the mixture reaches approximately 140°C. A 0.5% solids solution of this resin in N-methylpyrrolidone has an inherent viscosity of about 0.17.

Upon cooling, the reaction product is ground to a fine powder using a Pallman grinder and sieved, with particles passing through a 200 mesh screen and caught by a 325 mesh screen being saved. This powder then is used to continuously coat 0.200 × 0.100 inches rectangular copper wire at 10 feet/min. using a S.A.M.E.S.

electrostatic powder spray equipment and the coated wire is cured in an 18 ft. vertical oven with a temperature profile of 220°C at the bottom to 440°C at the top. A coating thickness of approximately 1.5 mils is deposited atop the wire in one application and the resulting insulated wire can be employed to wind the motor field poles of a dynamoelectric machine.

EXAMPLE 2

An esterimide containing tin in the backbone of the polymer is prepared by removing about one-half of the reaction volatiles from a tin containing polyester formulation and then adding a diacid diimide prepared separately utilizing the techniques described in EXAMPLE 1. More specifically, a partially reacted tin containing polyester is prepared by mixing 60 grams tris(2-hydroxyethyl)isocyanurate, 113 grams dimethyl terephthalate, 40 grams ethylene glycol, 0.008 grams litharge and 5.8 grams di-n-butyltin oxide. The mixture then is placed in a one liter resin flask immersed in an oil bath and heated under a slow stream of nitrogen to an oil temperature of 183°C over 5 hours. During this time, 19 g. of volatiles (water and methanol) generally are collected in a Dean and Stark trap, representing about one-half of the theoretical amount of reaction volatiles calculated from the composition of the feed material. To this molten reaction mixture is added 109 grams of the diacid diimide of EXAMPLE 1 in 3 equal portions over 4 hours with the oil bath temperature being raised slowly to 228°C. The resulting viscous liquid is stirred under a slow stream of nitrogen for 6 additional hours at 210°–227°C whereafter the homogeneous dark melt is cooled to give a brittle solid with a softening point of approximately 152°C.

A small amount of this brittle solid then is dissolved in N-methylpyrrolidone to obtain a 30% solids solution, which solution is used to coat a 4 × 5 inches copper plate using a 10 mil doctor knife. The coating is cured for one-half hour at 200°C and one-half hour at 250°C whereupon the copper plate can be bent around a one-eighth inch mandrel without cracking the coating. A 0.5% solids solution of this resin in N-methylpyrrolidone has an inherent viscosity of approximately 0.14.

EXAMPLE 3

A tin containing polyester is prepared by adding 90 grams tris(2-hydroxyethyl)isocyanurate, 58.4 grams dimethyl terephthalate, 0.08 grams litharge and 5.4 g. di-n-butylin oxide to a 500 milliliter flask immersed in an oil bath. The mixture is melted and then heated with stirring under a stream of nitrogen over 3 hours to an oil temperature of approximately 180°C. During this time, 12 grams of methanol is collected in a Dean and Stark trap.

A diester of the diacid diimide of EXAMPLE 1 next is prepared by adding 109 grams of the diacid diimide of EXAMPLE 1 to 30 grams of ethylene glycol, 14 grams of N-methylpyrrolidone and 0.08 grams of litharge in a 500 milliliter flask immersed in an oil bath. The mixture then is heated under a stream of nitrogen to an oil bath temperature of 214°C over a 6 hour period. During this period, the expected amount of water from the reaction, i.e., 7 milliliters of water, generally is collected in a Dean and Stark trap.

The diester of the diimide then is mixed with the tin containing polyester and heated under a stream of nitrogen to a maximum oil bath temperature of 228°C over 9 hours, during which time 6 milliliters of distillate typically is collected. Upon cooling, a brittle solid is obtained with a softening point of 142°–144°C. A 30% solution of the solid in N-methylpyrrolidone has a viscosity of 3.7 poise while a 0.5% solution of the solid in N-methylpyrrolidone has an inherent viscosity of 0.105.

The brittle solid is ground in a pebble mill and sieved with the portion passing through a 200 mesh screen and caught by a 325 mesh screen being saved for electrostatic spray coating. One foot long pieces of rectangular copper wire (0.160 × 0.080 inches) then are cleaned by washing with acetone, dipping in 10% hydrochloric acid, washing with distilled water, dipping in 1 molar sodium bicarbonate at 70°C for 2 minutes, washing with distilled water and wiping with acetone. After drying, the rectangular wire is electrically grounded and suspended in a Plexiglas enclosure whereafter the 200–325 mesh powder is sprayed into the enclosure for approximately 2 minutes using a S.A.M.E.S. electrostatic powder spray equipment. The coated wire is removed from the enclosure and placed in a force draft oven for 3 minutes at 350°C. The resulting coating has good flexibility and adhesion as determined by bending the wire around a ½ inch mandrel. Cross-sections of this wire show the coating to be very uniform around the wire, with the coating thickness at the corners substantially equal to the coating on the flats and edges.

EXAMPLE 4

A tin containing polyester is formed by mixing 18.5 grams tris(2-hydroxethyl)isocyanurate, 50.8 grams dimethyl terephthalate, 17.6 ethylene glycol, 0.001 grams litharge, and 25 grams di-n-butyltin diacetate and cooking the mixture for approximately 6 hours to a maximum pot temperature of 175°C under a nitrogen bleed. During this time, the expected amount of reaction volatiles (i.e., a total of 23 grams methanol and acetic acid) generally are collected.

After preparation of a diacid diimide and conversion of the diacid diimide to an ethylene glycol diester of the diacid diimide, (utilizing the procedures described in EXAMPLE 1), the ethylene glycol diester of the diacid diimide is mixed with the tin containing polyester in a 1:2 weight ratio by adding the ethylene glycol diester of the diacid diimide to the tin containing polyester at 190°C in approximately 20 equal portions over a 4 hour interval. The tin containing esterimide polymer then is heated to a temperature of approximately 225°C in a rapid stream of nitrogen until the softening point of the polymer reaches approximately 120°C.

After the tin containing esterimide polymer has cooled to a solid, the polymer is ground to a particle size of approximately 200 mesh and the powder is sprayed onto a copper conductor at ground potential using S.A.M.E.S. electrostatic powder spray equipment, i.e., equipment which charges the particles by fluidizing them in dry air, passing them through a −90KV field and directing them toward the grounded conductor. A grounded rectangular conductor (0.200 × 0.100 inches) passing through a cloud of charged particles in a Plexiglas enclosure at a rate of approximately 12 ft./min. acquired a coating thickness of approximately 2 mils. After curing the polymer by passing the coated wire through an oven at 230°–450°C at a speed of 12 ft./min., the insulated wire can be employed to wind the motor field poles of a dynamoelectric machine.

EXAMPLE 5

A polyimide is prepared by mixing 192 grams trimellitic anhydride, 58 grams hexamethylene diamine, and 250 grams N-methylpyrrolidone and heating the mixture to a maximum pot temperature of 175°C for approximately 8 hours during which time 17 g. of water is collected in a Dean and Stark trap. After the polyimide is washed successively in water, a 1% hydrochloric acid solution, and water, the polyimide is dried to a maximum temperature of 180°C and a pressure of 1 Torr over 18 hours. The polyimide then is converted to the diester of the polyimide by mixing 100 grams of the polyimide with 150 grams diethylene glycol and 0.8 grams litharge in a 500 milliliter flask immersed in an oil bath with the oil bath being heated to 237°C over 10 hours with a slow nitrogen bleed. During this time, 6 grams of water generally is collected in a Dean and Stark trap. The clear solution, while still hot, is poured into water, filtered, washed again with water, filtered and dried to 72°C at a pressure of 1 Torr for 18 hours. One part by weight of the diester of the diacid diimide then is added to two parts by weight of a tin containing polyester formed by the method described in EXAMPLE 1 over a period of approximately 4 hours with constant agitation to form a tin containing branched esterimide polymer. The esterimide polymer next is heated further at a temperature of 220°C in a rapidly flowing nitrogen stream to increase the softening point of the polymer to approximately 125°C. After the esterimide resin is ground to a powder, conventional electrostatic techniques are employed to coat rectangular copper wire (0.200 × 0.100 inches) with a 1 mil thick esterimide polymer coating which is cured by passing the wire at a speed of 10 ft./min. through an oven 18 ft. long with a temperature profile from 220°C to 440°C. The coated wire then is dip coated with two coats of Pyre ML wire enamel to overcoat the tin containing esterimide insulation with an approximately 0.3 mil thick coating of the Pyre ML. The resultant composite insulation exhibits a dielectric strength of approximately 1200 volts, when measured using a ¼ inch wide aluminum foil electrode wrapped tightly around the circumference of the wire.

EXAMPLE 6

An ester containing tin in the polymer backbone is prepared by mixing 600 grams tris(2-hydroxyethyl-)isocyanurate, 776 grams dimethyl terephthalate, 125 grams ethylene glycol, 0.8 grams litharge and 52 grams di-n-butyltin oxide in a five liter flask immersed in an oil bath and heating the mixture for approximately 7 hours to an oil temperature of 190°C under a nitrogen bleed with continuous agitation. As described relative to EXAMPLE 1, ethylene glycol is returned to the reaction chamber by a gravity feed utilizing a steam condenser at the exhaust port of the reaction chamber and 237 grams of reaction volatiles are collected. The tin containing polyester thus formed then is combined with the ethylene glycol diester of the diacid diimide to produce an esterimide polymer having a softening point between 80°C and 150°C utilizing procedures described in EXAMPLE 1. The resultant esterimide polymer containing tin next is ground to a particle size of 200 to 400 mesh and electrostatically sprayed onto a grounded rectangular conductor whereafter the coating is cured in an 18 ft. long oven set at 220°-440°C utilizing a speed of 10 ft./min. to coat the wire with an approximately 1 mil thick insulation. After curing the esterimide coating, the coated wire is passed twice through an esterimide enamel solution using conventional dip coating techniques to coat a 0.6 mil thick esterimide layer thereon. The resultant composite insulation exhibits a dielectric strength of about 2000 volts.

What I claim as new and desire to secure by Letters Patent of the United States is:

1. A method of forming branched thermosetting esterimide polymer resin powder suitable for deposition atop an electrical conductor comprising preparing a polyester by reacting at least one di- or trifunctional polyhydric alcohol and at least one polycarboxylic acid or dialkyl ester thereof selected from the group consisting of isophthalic, terephthalic, benzophenone dicarboxylic and mixtures of the foregoing with up to 50% by weight of an acid or alkyl ester thereof selected from the group consisting of succinic, trimesic, hemimellitic, trimellitic, orthophthalic, tetrachlorophthalic, sebacic, hexachloroendomethylene tetrahydrophthalic in the presence of a di-functional ester forming organotin compound to produce a hydroxy terminated polyester containing between 0.4 and 2% by weight tin atoms in the polymer backbone, forming a polyimide by reacting a diamine and an aromatic carboxylic anhydride containing at least one additional carboxylic group, preparing an esterimide polymer by reacting said polyimide with said tin containing hydroxy terminated polyester to obtain a branched thermosetting esterimide resin containing tin atoms in the polymer backbone, said resin containing by weight 70–60% polyester and 30–40% polyimide and grinding said branched esterimide resin to a particle size between approximately 10 and 150 micrometers for powder deposition atop a conductor.

2. A method of forming an esterimide polymer resin according to claim 1 wherein said polyimide is converted to a polyhydric diester prior to reaction with said hydroxy terminated polyester containing tin atoms in the polymer backbone.

3. A method of forming an esterimide polymer resin according to claim 1 including further reacting said esterimide resin to increase the softening point of the resin to a temperature between 80°C and 150°C prior to grinding the resin into particles.

4. A method of forming an esterimide polymer resin according to claim 1 wherein said di-functional organotin compound is selected from a group consisting of di-alkyltin oxide and dialkyltin diesters of a short chain acid.

5. A method of forming an esterimide polymer resin according to claim 1 wherein said organotin compound is added in the form of di-n-butyltin oxide.

6. An esterimide polymer resin produced by the method of claim 1.

7. An esterimide polymer resin according to claim 6 wherein said branched thermosetting esterimide polymer resin is characterized by a particle size between 200 and 400 mesh and a softening point between 80°C and 150°C.

8. An esterimide polymer resin according to claim 6 wherein said polyester containing tin in the polymer backbone is the reaction product of at least one polyhydric alcohol, an organotin compound selected from a group consisting of di-n-butyltin oxide, di-n-butyltin diacetate and di-n-butyltin disebacate, and acid selected from a group consisting of terephthalic acid, isophthalic acid and benzophenone dicarboxylic acid, and litharge.

9. An esterimide polymer resin according to claim 6 wherein said organotin compound is di-n-butyltin oxide and said polyhydric alcohol contains at least 60% by weight tris(2-hydroxyethyl)isocyanurate.

10. A method of forming branched thermosetting polymer resin powder suitable for deposition atop an electrical conductor comprising preparing a polyester by reacting 16–50 weight % of tris (2-hydroxyethyl) isocyanurate, 8–20 weight % of ethylene glycol and 32–56 weight % of dimethyl terephthalate in the presence of 2–23 weight % of di-functional di-n-butyltin oxide and 0.001–0.05 weight % litharge to produce a hydroxy terminated polyester, with tin atoms in the polymer backbone, forming a polyimide by reacting a diamine and an aromatic carboxylic anhydride containing at least one additional carboxylic group, preparing an esterimide polymer by reacting said polyimide with said tin containing hydroxy terminated polyester to obtain a branched thermosetting esterimide resin containing tin atoms in the polymer backbone, said resin containing 70–60% polyester and 30–40% of polyimide by weight.

11. An esterimide resin produced by the method of claim 10.

* * * * *